US012481255B2

(12) United States Patent
Hirai et al.

(10) Patent No.: US 12,481,255 B2
(45) Date of Patent: Nov. 25, 2025

(54) CONTROL SYSTEM, CONTROL METHOD, AND CONTROL PROGRAM FOR DETERMINING OPERATION DATA BY REPEATEDLY CALCULATING CONTROL TARGET DATA INDICATING A PREDICTED VALUE OF A CONTROL TARGET IN A PLANT

(71) Applicants: ENEOS Corporation, Tokyo (JP); Preferred Networks, Inc., Tokyo (JP)

(72) Inventors: Taichiro Hirai, Tokyo (JP); Kosei Kanuma, Tokyo (JP); Hiroyuki Hino, Tokyo (JP); Yu Yoshimura, Tokyo (JP); Kazuki Uehara, Tokyo (JP); Akira Kinoshita, Tokyo (JP); Masahiro Sakai, Tokyo (JP); Keigo Kawamura, Tokyo (JP); Kaizaburo Kido, Tokyo (JP); Keisuke Yahata, Tokyo (JP); Keisuke Nakata, Tokyo (JP); Yo Iida, Tokyo (JP); Takuro Moriyama, Tokyo (JP); Masashi Yoshikawa, Tokyo (JP); Tsutomu Ogasawara, Tokyo (JP)

(73) Assignees: ENEOS CORPORATION, Tokyo (JP); PREFERRED NETWORKS, INC., Tokyo (JP)

( * ) Notice: Subject to any disclaimer, the term of this patent is extended or adjusted under 35 U.S.C. 154(b) by 414 days.

(21) Appl. No.: 17/973,868

(22) Filed: Oct. 26, 2022

(65) Prior Publication Data
US 2023/0138268 A1 May 4, 2023

(30) Foreign Application Priority Data
Nov. 2, 2021 (JP) .................................. 2021-179275

(51) Int. Cl.
*G05B 13/04* (2006.01)
*G05B 13/02* (2006.01)

(52) U.S. Cl.
CPC ......... *G05B 13/048* (2013.01); *G05B 13/027* (2013.01)

(58) Field of Classification Search
CPC .......................... G05B 13/048; G05B 13/027
See application file for complete search history.

(56) References Cited

U.S. PATENT DOCUMENTS

2001/0021900 A1* 9/2001 Kassmann ........... G05B 13/048
703/2
2004/0204775 A1* 10/2004 Keyes .................... G06Q 10/06
705/400

(Continued)

FOREIGN PATENT DOCUMENTS

| JP | 2002-373002 A | 12/2002 |
|----|---------------|---------|
| JP | 2018-77823    | 5/2018  |
| JP | 2020-135757   | 8/2020  |

*Primary Examiner* — Jigneshkumar C Patel
(74) *Attorney, Agent, or Firm* — GREENBLUM & BERNSTEIN, P.L.C.

(57) ABSTRACT

A control system includes at least one processor and at least one memory. The at least one processor is configured to determine operation data by repeating a process of calculating control target data indicating a predicted value of a control target in a plant and the operation data indicating an operation value of a control device of the plant by a given calculation model based on observation data indicating an actual value of the plant.

20 Claims, 9 Drawing Sheets

(56) References Cited

U.S. PATENT DOCUMENTS

2005/0049728 A1* 3/2005 Pado .................... G05B 13/027
   700/48
2017/0255177 A1* 9/2017 Tokuda .................. G05B 17/02

* cited by examiner

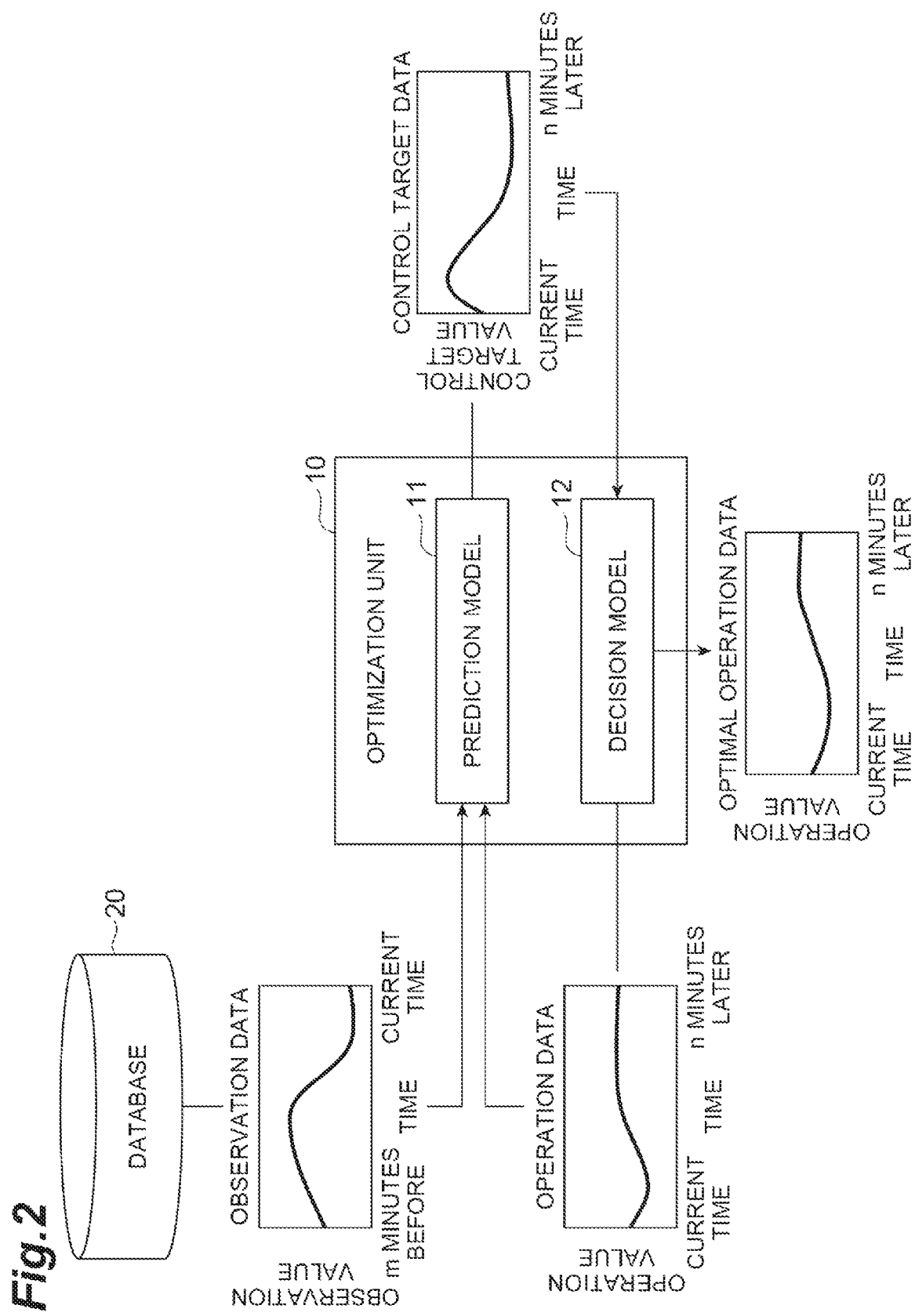

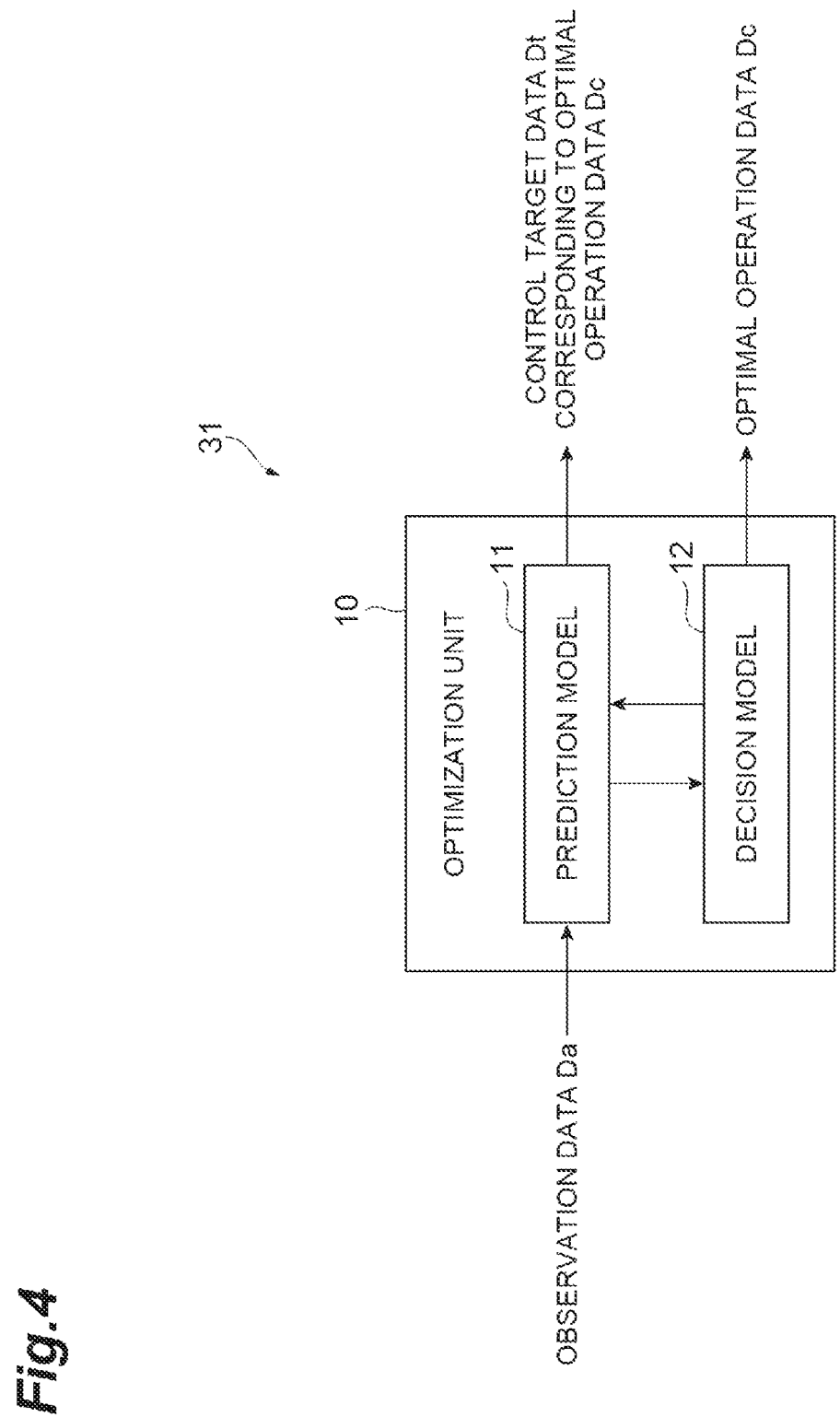

CONTROL SYSTEM, CONTROL METHOD, AND CONTROL PROGRAM FOR DETERMINING OPERATION DATA BY REPEATEDLY CALCULATING CONTROL TARGET DATA INDICATING A PREDICTED VALUE OF A CONTROL TARGET IN A PLANT

CROSS-REFERENCE TO RELATED APPLICATIONS

This application is based upon and claims the benefit of priority from Japanese Patent Application No. 2021-179275, filed on Nov. 2, 2021, the entire contents of which are incorporated herein by reference.

BACKGROUND

One aspect of the present disclosure relates to a control system, a control method, and a control program.

Japanese Patent Publication No. 2002-373002 A describes a control device that constructs model prediction control by directly using a process simulator. The control device includes a process prediction means that predicts behavior of a process controlled value based on measured values of a disturbance sensor and a process output sensor, a process operation variable command value, and a predicted value of a process disturbance, a step response selection means that selects a current step response time series based on the process operation variable command value and a measured value of the process disturbance, and a process optimization means that determines an optimal operation variable command value over a predetermined period using at least the predicted process predicted value and the selected step response time series as inputs.

SUMMARY

It is desirable to reduce a load on a proper operation of a plant.

A control system according to an aspect of the present disclosure includes at least one processor and at least one memory. The at least one processor is configured to determine operation data by repeating a process of calculating control target data indicating a predicted value of a control target in a plant and the operation data indicating an operation value of a control device of the plant by a given calculation model based on observation data indicating an actual value of the plant.

A control method according to an aspect of the present disclosure is executable by a control system including at least one processor and at least one memory. The method comprising: determining operation data by repeating a process of calculating control target data indicating a predicted value of a control target in a plant and the operation data indicating an operation value of a control device of the plant by a given calculation model based on observation data indicating an actual value of the plant.

A non-transitory computer-readable storage medium according to an aspect of the present disclosure stores processor-executable instructions to: determine operation data by repeating a process of calculating control target data indicating a predicted value of a control target in a plant and the operation data indicating an operation value of a control device of the plant by a given calculation model based on observation data indicating an actual value of the plant.

In these aspects, the control target data and the operation data are updated by repeating the process using the calculation model, and the operation data is finally determined. It is therefore possible to reduce the load on the proper operation of the plant.

According to an aspect of the present disclosure, it is possible to reduce the load on the proper operation of the plant.

BRIEF DESCRIPTION OF THE DRAWINGS

FIG. 2 is a diagram showing an example of an optimization unit.

FIG. 4 is a diagram showing an example of implementation of the optimization unit.

DETAILED DESCRIPTION

Hereinafter, examples of the present disclosure will be described in detail with reference to the accompanying drawings. In the description of the drawings, the same or equivalent elements are denoted by the same reference signs, and the repeated description thereof will be omitted.

Overview of System

Figure 1:
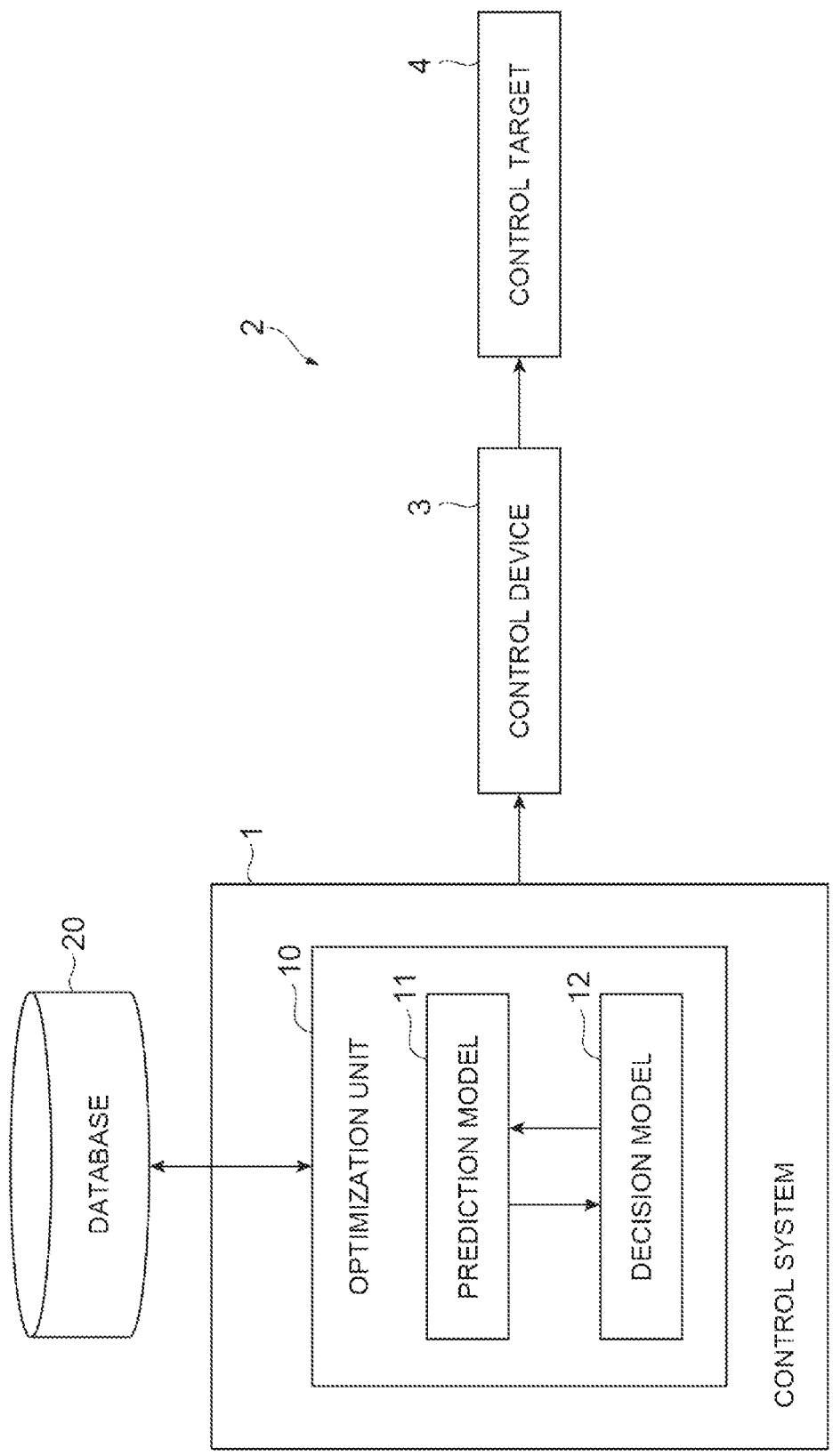
FIG. 1 is a diagram showing an example of application of a control system.

FIG. 1 is a diagram showing an example of application of a control system 1 according to an embodiment. The control system 1 is a computer system that assists operation of a plant 2. In one example, the control system 1 generates and outputs operation data indicating an operation related to the plant 2. The control system 1 may output the operation data to the plant 2 for autonomous operation of the plant 2. Alternatively, the control system 1 may provide an operator of the plant 2 with the operation data to assist the operator. The control system 1 may be constructed as a component of the plant 2 or may be provided outside the plant 2.

The plant 2 is a production facility for industrial activities and includes a group of devices for producing a given product. Examples of the plant 2 include, but are not limited to, petroleum-related plants such as petroleum refining plants and petrochemical plants. The petroleum-related plants include, for example, a group of devices intended for petroleum refining or for the production of petrochemicals. The group of devices includes, for example, at least one of an atmospheric distillation device, a hydrorefining device, a catalytic reforming device, a catalytic cracking device, a hydrocracking device, and a desulfurization device.

The plant 2 comprises a control device 3. The control device 3 is a device that controls a control target 4. The control target 4 refers to an object to be controlled in the operation of the plant 2. The control target 4 may be a device constituting the plant 2. Examples of the control target 4 include production facilities (tanks, treatment furnaces, etc.), industrial machines, electric circuitry, sensors, communication networks, infrastructure facilities (water systems, smart grids, etc.), and movable objects (automobiles, robots, ships, flying objects, etc.). Alternatively, the control target 4 may be a product produced by the plant 2. The control device 3 may control physical parameters (temperature, pressure, height, etc.) related to the device in the plant 2. In a case where the control target 4 is a product, the control device 3 may control the device within the plant 2 such that physical parameters (e.g., concentration, mass, content, etc.) related to the product meet given criteria.

Conventionally, plants are operated by constant monitoring and operation by operators. Therefore, the operation of the plant largely depends on the skill of the operator. In recent years, with the decrease in skilled operators, the inheritance of skills necessary for the operation of plants has become a problem. In one example, the control system 1 outputs operation data indicating an operation value of the control device 3 to the control device 3, and the control device 3 controls the control target 4 based on the operation data. By this autonomous operation, the plant 2 can be appropriately operated without being affected by the skill of the operator. Alternatively, the control system 1 may provide the operation data to the operator. Since the operator can operate the control device 3 with reference to the operation data, the load of the operator is reduced. In addition, an inexperienced operator can operate the control device 3 in the same manner as a skilled operator. Regardless of whether the control device 3 is operated automatically or manually, the control system 1 can reduce the load on the operation of the plant 2. Furthermore, the control system 1 can contribute to the production efficiency of the plant 2 equal to or more than the skilled operator.

System Configuration

As shown in FIG. 1, the control system 1 is connected to the control device 3 and a database 20 via a given communication network. The communication network may be constructed using at least one of the Internet and an intranet. The communication network may be constructed by a wired network, a wireless network, or a combination thereof.

The database 20 is a device that stores various types of data used in the control system 1. The database 20 may be a component of the control system 1 or may be provided in a computer system different from the control system 1. The database 20 may be a component of the plant 2 or may be provided outside the plant 2. The database 20 stores observation data indicating an actual value of the plant 2. The observation data is continuously or intermittently recorded by one or more sensors in the plant 2 and stored in the database 20. In one example, the observation data is time-series data for a set of one or more physical parameters. Examples of the physical parameters indicated by the observation data include, but are not limited to, pressure, temperature, and concentration. At least part of the physical parameter indicated by the observation data may be the same as at least part of the physical parameter of the operation data or may be the same as at least part of the physical parameter of control target data described later.

FIG. 1 also shows the functional configuration of the control system 1. In one example, the control system 1 comprises an optimization unit 10 as a functional component. The optimization unit 10 is a functional module that repeats a process of calculating the control target data and the operation data by a given calculation model based on the observation data, and finally determines the operation data. The operation data determined by the optimization unit 10 may be optimal operation data indicating an optimal operation value of the control device 3. It should be noted that, in the present disclosure, the "optimal operation data (operation value)" refers to operation data (operation value) estimated to be optimal, and is not necessarily the optimal operation data (operation value) in reality. In the following description, the operation data finally determined by the optimization unit 10 is also referred to as "optimal operation data" in order to distinguish it from operation data calculated in the middle of iteration process.

The observation data is electronic data indicating the actual value of the plant 2. The "actual value of plant" refers to a value based on an actual measurement in a time width from a certain time point in the past to a given reference time. The actual value of the plant may be an actual measurement value, a value obtained by processing such as outlier removal or interpolation on the measurement value, or a relative value from these values at a certain time point. In the present disclosure, the reference time is, for example, a current time.

The control target data is electronic data indicating a predicted value of the control target 4 in the plant 2. The "predicted value of control target" refers to a value indicating the state of the control target 4 in a given time width after the given reference time. The predicted value of the control target may be represented by a relative value or statistic from the predicted value at a certain time point. In one example, the control target data is time-series data for a set of one or more physical parameters. In another example, the control target data is an average value of a certain physical parameter in a certain time width. The control target data may indicate at least one of a physical parameter (e.g., temperature, pressure, height, etc.) related to a device in the plant 2 and a physical parameter (e.g., concentration, mass, content, etc.) related to a product.

The operation data is electronic data indicating an operation value of the control device 3. The "operation value of control device" refers to a value based on the operation of the control device 3 in a given time width after the given reference time. The operation value of the control device may be represented by a relative value from the operation value at a certain time point or a statistic of the operation value. Therefore, the operation value indicated by the operation data is also a predicted value. The time width of the operation data may be the same as or different from the time width of the control target data. In one example, the operation data is time-series data of a set of one or more physical parameters. In another example, the operation data is an average value of a certain physical parameter in a certain time width. Examples of physical parameters indicated by the operation data include, but are not limited to, flow rate, setting temperature, and setting pressure.

In one example, the calculation model includes a prediction model 11 and a decision model 12. The prediction model 11 is a calculation model that calculates the control target data based on the observation data and the latest operation data in the iteration. The prediction model 11 may receive a future disturbance value in addition to the observation data and the operation data. For example, the future disturbance value indicates a disturbance factor that is not included in the operation data, such as an amount of inflow to the plant 2 and an outside air temperature. The future disturbance value is a predicted value. The future disturbance value may be set by a user or may be predicted by the prediction model 11. Alternatively, assuming that the currently observed disturbance value continues, the observed value may be set as a future disturbance value. The decision model 12 is a calculation model that calculates the operation data based on the latest control target data in the iteration. The decision model 12 may receive the latest operation data in the iteration in addition to or instead of the latest control target data.

FIG. 2 is a diagram showing an example of the optimization unit 10 using the prediction model 11 and the decision model 12. In this figure, the reference time of the observation data, the operation data, and the control target data is the current time. The optimization unit 10 inputs the observation data and the initial operation data to the prediction model 11 to calculate the control target data, and inputs the control target data to the decision model 12 to calculate the operation data. This series of processing using the prediction model 11 and the decision model 12 corresponds to one-loop process. In the second loop, the optimization unit 10 inputs the observation data and the calculated operation data to the prediction model 11 to calculate new control target data. The optimization unit 10 inputs that control target data to the decision model 12 to calculate new operation data. This operation data is used in the third loop.

In short, the optimization unit 10 calculates new control target data based on the observation data read from the database 20 and the latest operation data in the iteration. The "latest operation data" in the i-th loop is the operation data obtained in the (i−1)-th loop. The optimization unit 10 calculates new operation data based on the new control target data, i.e., the latest control target data in the iteration. In the iteration, the optimization unit 10 uses the observation data read from the database 20 in each loop. The fact that new control target data and new operation data are calculated in each loop means that the control target data and the operation data are updated by the iteration. The optimization unit 10 repeats the processing using the prediction model 11 and the decision model 12 until a given termination condition is satisfied, and determines the finally obtained operation data as the optimal operation data.

In one example, the prediction model 11 may include a neural network that receives inputs of the observation data and operation data and outputs the control target data. In this case, the prediction model 11 is a learned model. Examples of the neural network include, but are not limited to, a recurrent neural network (RNN). It is assumed that the number of physical parameters of the observation data, operation data, and control target data is p, q, and r, respectively. In this case, the neural network may receive p physical parameters of the observation data or time-series data thereof and q physical parameters of the operation data or time-series data thereof, and output one physical parameter of the control target data or time-series data thereof. In this example, the prediction model 11 predicts the whole of the control target data by including r neural networks corresponding to r physical parameters of the control target data or time-series data thereof. Alternatively, a single neural network may receive inputs of p physical parameters of the observation data or time-series data thereof and q physical parameters of the operation data or time-series data thereof, and output r physical parameters of the control target data or time-series data thereof.

In machine learning for obtaining the prediction model 11, training data corresponding to each of the observation data, control target data, and operation data is prepared in advance. A given machine learning system generates the prediction model 11 using the training data. In one example, the machine learning system executes the following processing on each record of the training data. That is, the machine learning system inputs the observation data and operation data indicated in the record to the machine learning model, and obtains an estimated value of the control target data output from the neural network. The machine learning system updates parameters in the machine learning model using a method such as back propagation, based on an error between the estimated value and the ground truth of the control target data indicated by the record. For example, the machine learning system updates weights of the neural network. The machine learning system continues the machine learning until a given termination condition is satisfied. For example, the machine learning system may evaluate the performance of the machine learning model using verification data, and terminate the machine learning in a case where the evaluation satisfies given criteria. Alternatively, the termination condition may be set based on an error, or may be set based on the number of records to be processed, i.e., the number of times of learning. The machine learning system provides a machine learning model at a time point when the machine learning ends, as the prediction model 11.

The machine learning system may be part of the control system 1 or a computer system different from the control system 1. Since the learned model is portable between computer systems, the control system 1 is able to use the prediction model 11 generated by another computer system.

In one example, the decision model 12 includes a non-linear optimization using a cost function that calculates a cost related to the plant 2. The decision model 12 applies at least one of the control target data and the operation data to the cost function to calculate the cost, and calculates the operation data based on the cost. The cost is a value indicating an evaluation of at least one of the control target data and the operation data. In one example, the decision model 12 calculates the new operation data by the non-linear optimization so as to reduce the cost. It can be said that such a calculation is a process for searching for more optimal operation data. In another example, the decision model 12 may perform the optimization to increase the cost.

In one example, the decision model 12 uses a function to calculate a cost related to at least one of profitability and stability of the plant 2. In the present disclosure, the cost related to the profitability is also referred to as profitability cost, and the cost related to the stability is also referred to as stability cost. The "profitability of plant" is an index indicating how efficiently a profit can be produced by operating a plant. A low profitability cost means high profitability, and a high profitability cost means low profitability. The "stability of plant" is an index indicating the performance of maintaining a state in which the appropriate operation of the plant is guaranteed or of rapidly returning the plant to such a state. A low stability cost means high stability, and a high stability cost means low stability.

In one example, the profitability cost is set based on a profit calculated from the cost of a product produced by the plant 2, the cost of a raw material, and a utility cost required to operate the processing of manufacturing devices.

Figure 3A:
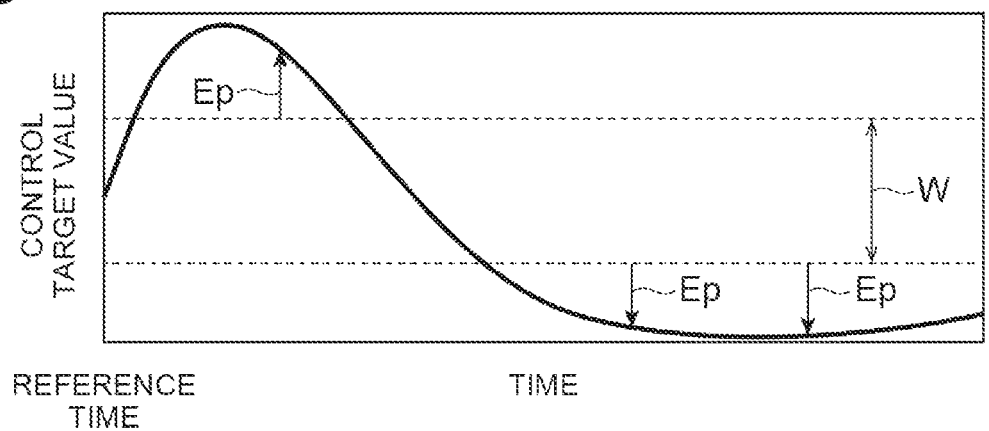
FIGS. 3A, 3B and 3C are diagrams showing examples of cost related to stability of a plant.
Figure 3B:
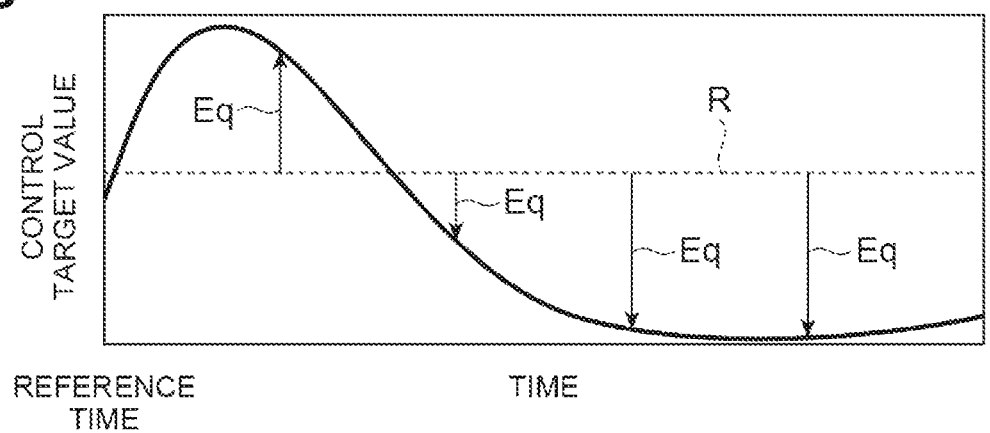
Figure 3C:
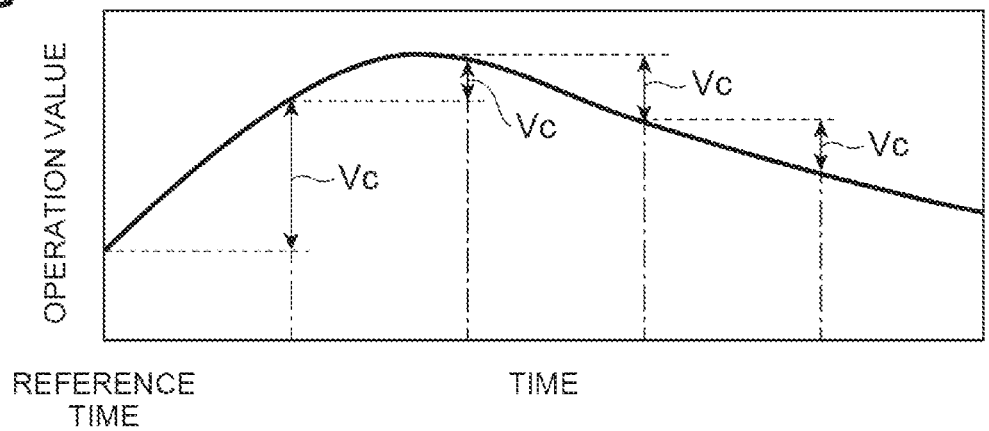

In one example, the stability cost is set based on at least one of a degree of deviation of the control target data from a setting value indicating a target for the control target 4 and an amount of fluctuation of the operation data. FIGS. 3A, 3B and 3C are diagrams showing examples of the stability cost. FIGS. 3A and 3B show graphs of the stability cost based on the degree of deviation of the control data. In these graphs, the vertical axis represents the value of a certain physical parameter related to the control target 4 as a control target value, and the horizontal axis represents a time axis from the reference time. FIG. 3C shows a graph of the stability cost based on the amount of fluctuation of the operation data. In this graph, the vertical axis indicates the value of a certain physical parameter as an operation value, and the horizontal axis indicates a time axis from the reference time.

In FIG. 3A, the setting value for the control target 4 is represented by a management range W defined by a given upper limit and/or a given lower limit. In this example, the optimization unit 10 sets a measurement point for each given time interval from the reference time, and calculates a degree of deviation Ep of the control target data from the management range W at each measurement point. The given time interval may be uniform or may vary. In a case where the control target value is within the management range W at a certain measurement point, the degree of deviation at the measurement point is 0. In one example, the cost function is a sum of squares of individual degrees of deviation, and the optimization unit 10 calculates the cost using that cost function. Although the management range W is fixed in FIG. 3A, the management range W may vary along the time axis.

In FIG. 3B, the setting value for the control target 4 is represented by a given reference value R. In this example, the optimization unit 10 sets a measurement point for each given time interval from the reference time, and calculates a degree of deviation Eq of the control target data from the reference value R at each measurement point. The given time interval may be uniform or may vary. In one example, the cost function is a sum of squares of individual degrees of deviation, and the optimization unit 10 calculates the cost using that cost function. Although the reference value R is fixed in FIG. 3B, the reference value R may vary along the time axis.

As shown in FIGS. 3A and 3B, in one example, the optimization unit 10 calculates the degree of deviation of the control target data from the setting value for the control target 4, at each of one or more measurement points on the time axis, and calculates the cost based on the plurality of degrees of deviation. The optimization unit 10 may calculate the cost based on a cost function other than the sum of squares.

As shown in FIG. 3C, the optimization unit 10 sets a measurement point for each given time interval from the reference time and calculates an amount of fluctuation Vc of the operation data between two adjacent measurement points or arbitrary selected two measurement points. The measurement points may be set at the reference time. The given time interval may be uniform or may vary. In one example, the cost function is a sum of squares of individual amounts of fluctuation, and the optimization unit 10 calculates the cost using that cost function.

Figure 5:
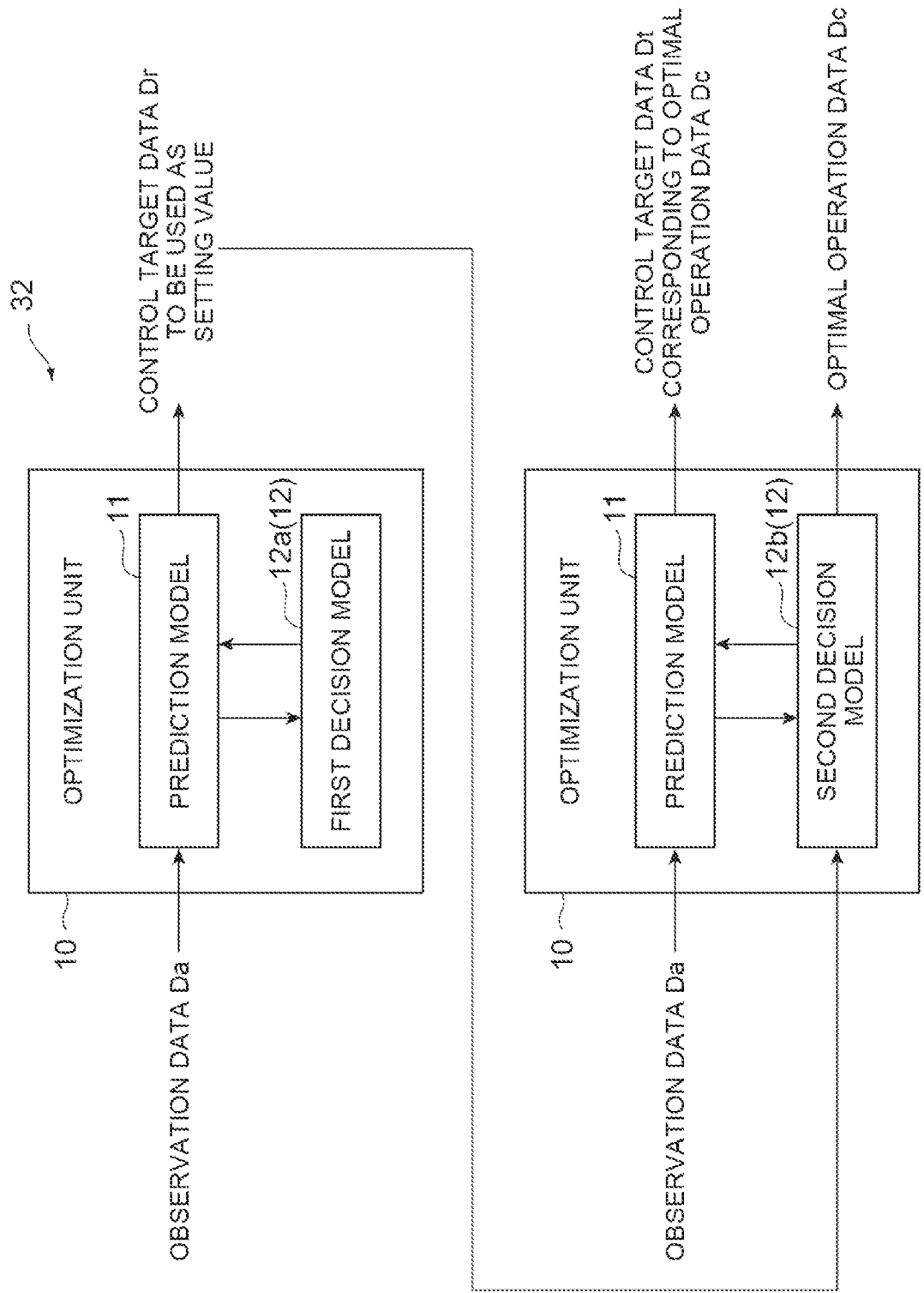
FIG. 5 is a diagram showing another example of implementation of the optimization unit.

FIGS. 4 and 5 are diagrams showing examples of implementation of the optimization unit 10 in consideration of at least one of profitability and stability of the plant 2.

In an implementation 31 shown in FIG. 4, the optimization unit 10 includes one prediction model 11 and one decision model 12. The decision model 12 calculates a cost using a cost function in which at least one of a group of profitability costs and a group of stability costs is considered. The optimization unit 10 receives an input of observation data Da, repeats a process using the prediction model 11 and the decision model 12, and determines optimal operation data Dc. The optimization unit 10 may further input the observation data Da and the optimal operation data Dc to the prediction model 11 to determine control target data Dt corresponding to the optimal operation data Dc. The control target data Dt indicates a predicted value related to the control target 4 when the control device 3 is operated based on the operation data Dc. In the implementation 31, the optimal operation data Dc can be obtained by such simple repetitive processing.

In an implementation 32 shown in FIG. 5, the optimization unit 10 includes one prediction model 11 and two decision models 12. The two decision models 12 are distinguished as a first decision model 12a and a second decision model 12b. In the implementation 32, a set of the profitability cost group and the stability cost group is divided into a first cost group and a second cost group. The first decision model 12a includes non-linear optimization using a first cost function related to the first cost group. The second decision model 12b includes non-linear optimization using a second cost functions related to the second cost group. In one example, the first cost function corresponds to at least the profitability cost and the second cost function corresponds to at least the stability cost. The first cost group may be a group of profitability costs, and the second cost group may be a group of stability costs. Alternatively, the first cost group may be constituted by the profitability cost group and part of the stability cost group, and the second cost group may be constituted by the remainder of the stability cost group. It is assumed that the cost group related to the stability is constituted by the degree of deviation of the control target data from the management range (FIG. 3A), the degree of deviation of the control target data from the reference value (FIG. 3B), and the amount of fluctuation of the operation data (FIG. 3C). In this case, the first cost group may be configured by the profitability cost group and the degree of deviation of the control target data from the management range, and the second cost group may be configured by the degree of deviation of the control target data from the reference value and the amount of fluctuation of the operation data.

In the implementation 32, the optimization unit 10 receives an input of the observation data Da, repeats the processing using the prediction model 11 and the first decision model 12a, and determines a control target data Dr to be used as a setting value for the control target 4. In the present disclosure, that iterative process is also referred to as a first process or first optimization. The optimization unit 10 sets the control target data Dr as a setting value for calculating the cost in the second decision model 12b. For example, the optimization unit 10 sets the control target data Dr as the reference value. The control target data Dr may be the reference value R shown in FIG. 3B.

Subsequently, the optimization unit 10 receives an input of the observation data Da, repeats the processing using the prediction model 11 and the second decision model 12b, and determines the optimal operation data Dc. In the present disclosure, that iterative process is also referred to as a second process or second optimization. In the second process, the optimization unit 10 calculates the cost based on the control target data Dr, which is a setting value, and the second cost function in the second decision model 12b, and calculates the operation data based on that cost. The optimization unit 10 may input the observation data Da and the optimal operation data Dc to the prediction model 11 to determine the control target data Dt corresponding to the optimal operation data Dc. The control target data Dt is expected to approximate the control target data Dr, which is a setting value. In the implementation 32, since the calculation of cost is divided into a plurality of cost functions, each cost function can be simplified. As another example, the optimization unit 10 may include one or more prediction models and three or more decision models. The optimization unit 10 receives an input of at least one of the observation data and control target data output from another prediction model, and repeats the processing using the prediction model and the decision model. Each prediction model outputs the control target data, and each decision model outputs the operation data as necessary.

Figure 6:
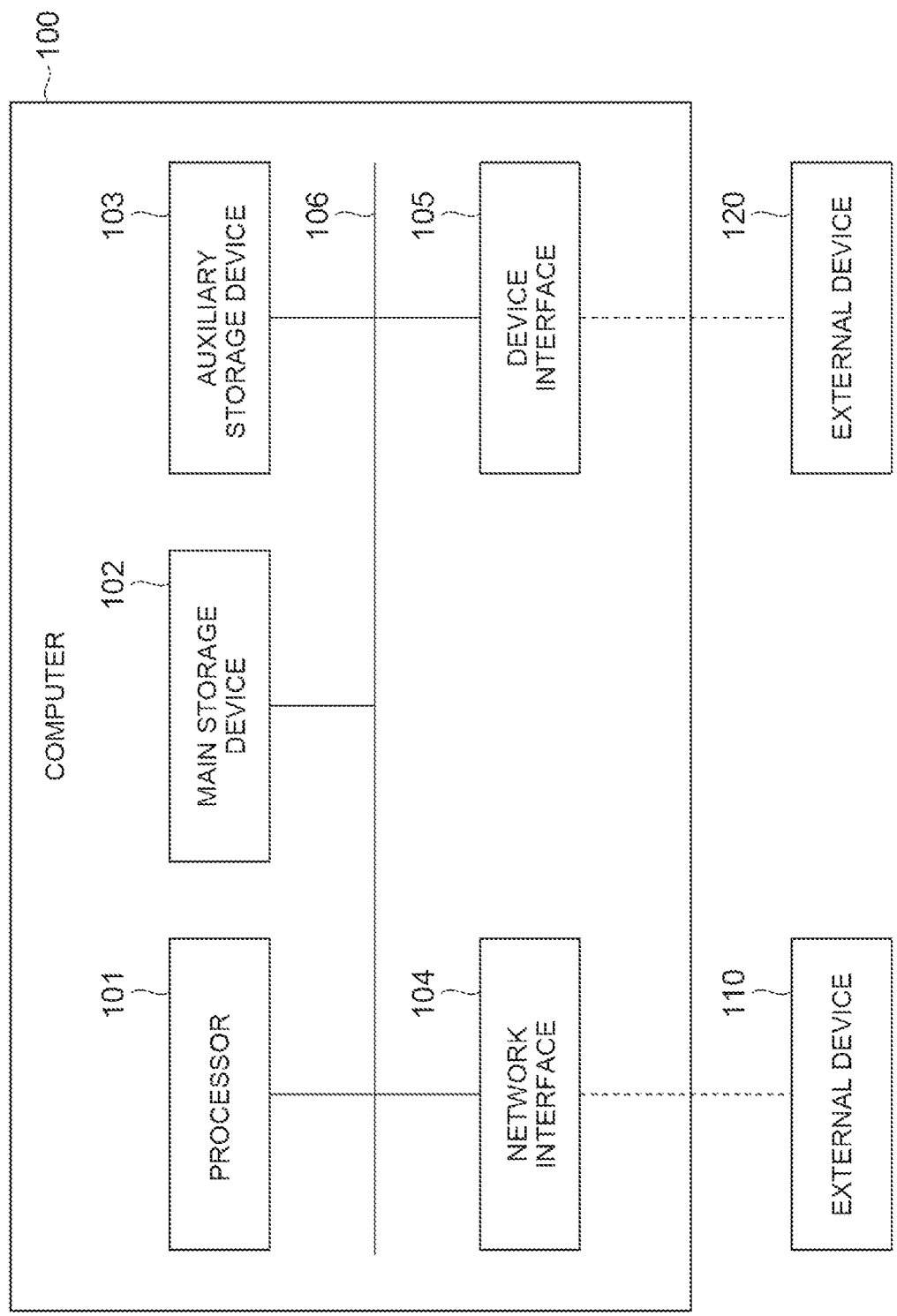
FIG. 6 is a diagram showing a general hardware configuration of a computer functioning as the control system.

FIG. 6 is a diagram showing a general hardware configuration of a computer 100 functioning as the control system 1. For example, the computer 100 include a processor 101, a main storage device 102, an auxiliary storage device 103, a network interface 104, and a device interface 105. These components are connected via a bus 106. The processor 101 is electronic circuitry that executes an operating system and an application program. Examples of the processor 101 include a CPU, a GPU, an FPGA, and an ASIC. The main storage device 102 is formed by, for example, a ROM and a RAM, and stores instructions to be executed by the processor 101 and various data. The auxiliary storage device 103 is formed by, for example, a hard disk or a flash memory, and generally stores a larger amount of data than the main storage device 102. The auxiliary storage device 103 stores a control program for causing at least one computer to function as the control system 1. The network interface 104 is formed by, for example, a network card or a wireless communication module, and transmits and receives data to and from an external device 110 via a communication network. Examples of the external device 110 include the database 20 and the control device 3. The device interface 105 is an interface for directly connecting to an external device 120, and is, for example, a universal serial bus (USB). Examples of the external device 120 may include an input device such as a keyboard, a mouse, and a touch panel, and an output device such as a monitor and a speaker.

Each functional module of the control system 1 is realized by reading a control program on the processor 101 or the main storage device 102 and executing the program. The control program includes codes for implementing each functional module of the control system 1. The processor 101 operates the network interface 104 or the external device 120 in accordance with the control program, and reads and writes data in the main storage device 102 or the auxiliary storage device 103. By this processing, each functional module of the control system 1 is realized. Data or databases necessary for the processing may be stored in the main storage device 102 or the auxiliary storage device 103.

The control system 1 may be formed by one or more computers. In a case where a plurality of computers is used, these computers are connected to each other via a communication network and one control system 1 is formed logically.

The control program may be provided by being fixedly recorded in a tangible recording medium such as a CD-ROM, a DVD-ROM, or a semiconductor memory. Alternatively, the control program may be provided via a communication network as data signals superimposed on a carrier wave.

Operation of System

Figure 7:
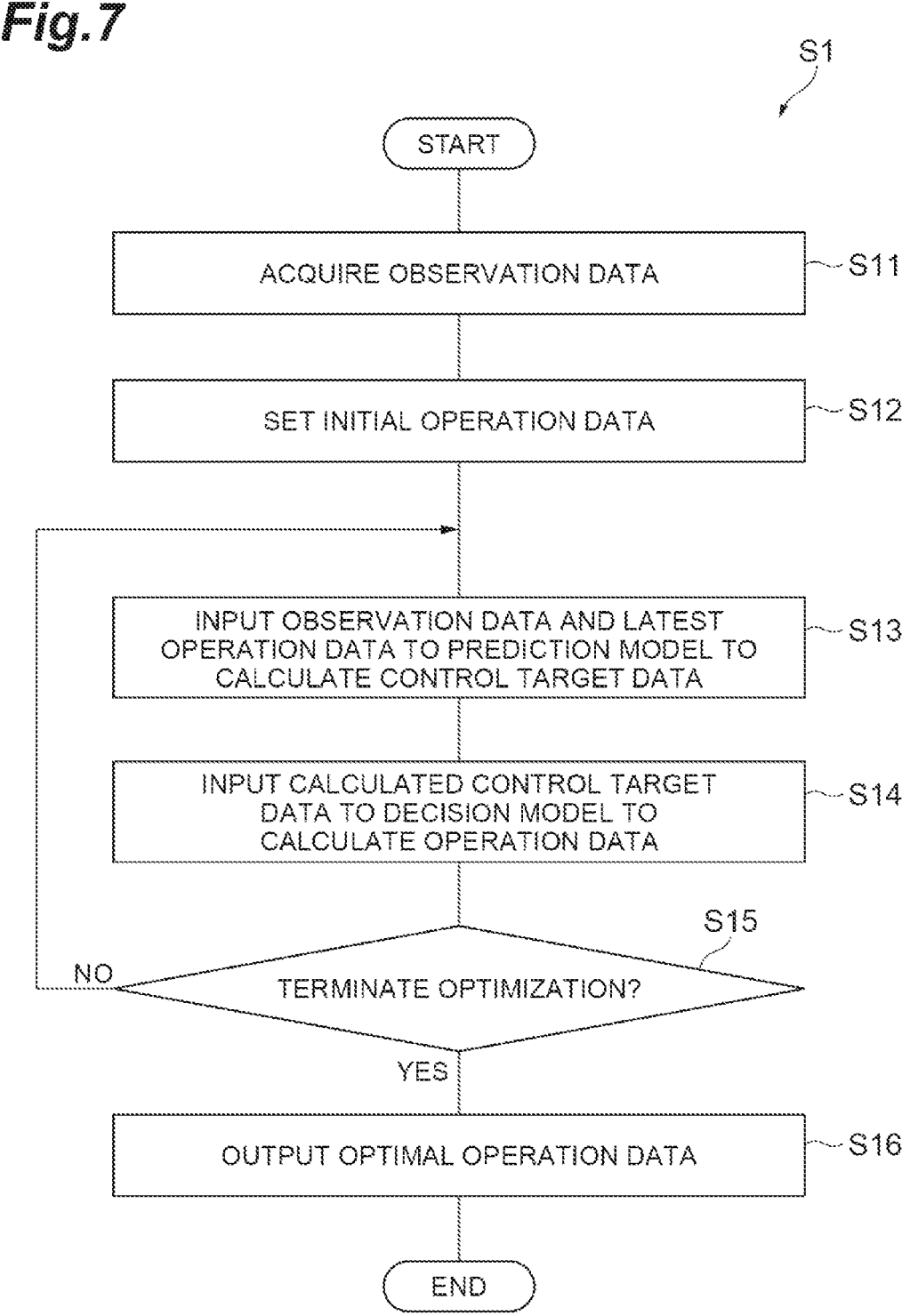
FIG. 7 is a flowchart showing an example of operation of the control system.
Figure 8:
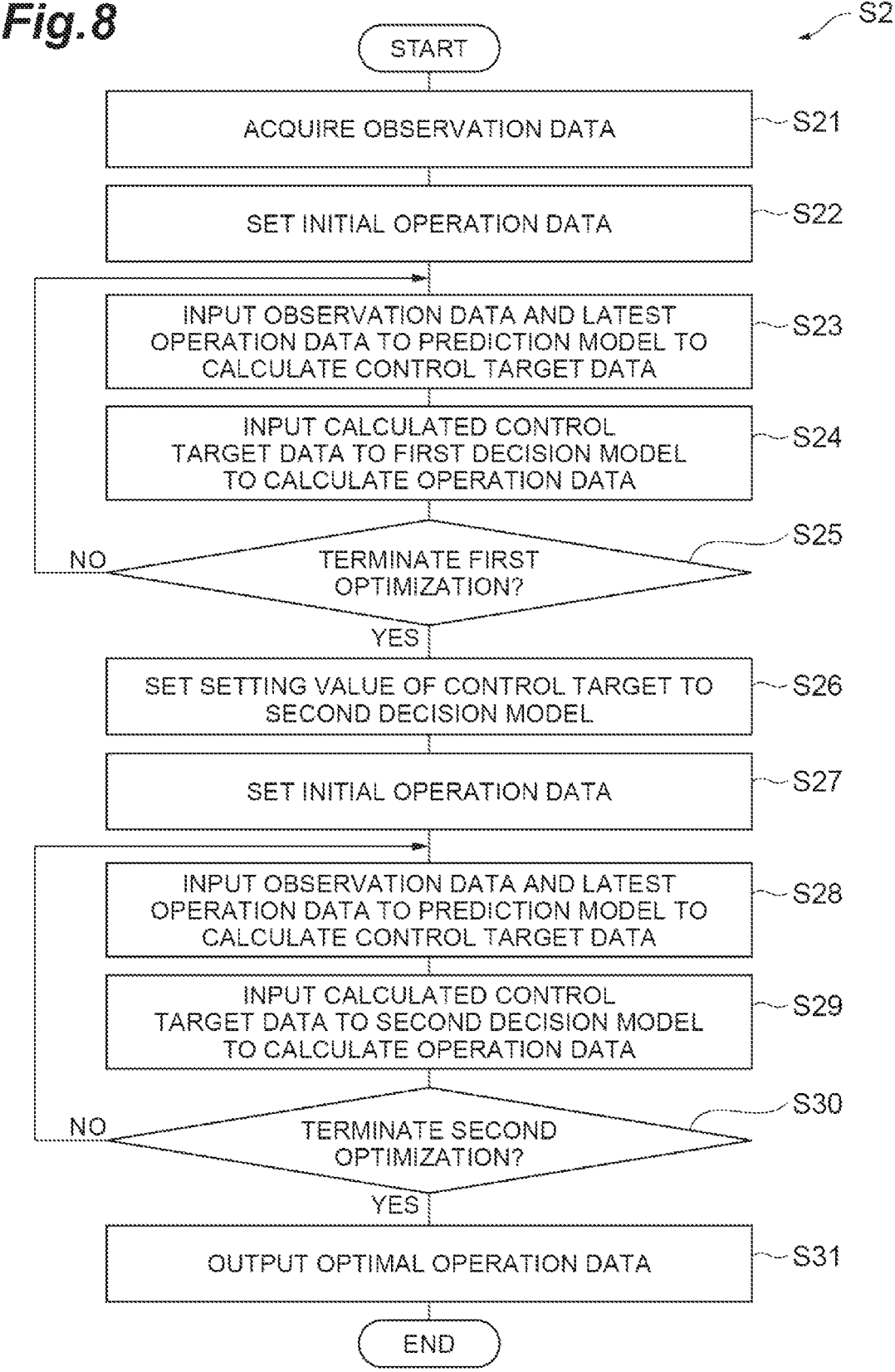
FIG. 8 is a flowchart showing another example of operation of the control system.

The operation of the control system 1 and the control method according to the embodiment will be described with reference to FIGS. 7 and 8. FIG. 7 is a flowchart showing an example of the operation of the control system 1 as a processing flow S1. FIG. 8 is a flowchart showing another example of the operation of the control system 1 as a processing flow S2. The processing flows S1 and S2 correspond to the implementations 31 and 32 described above, respectively.

First, the processing flow S1 will be described. In step S11, the optimization unit 10 acquires the observation data. In one example, the optimization unit 10 accesses the database 20 to read the observation data in a given time width from a certain time point in the past to the reference time. The reference time and the time width may be set in advance by the control system 1 or may be designated by the user of the control system 1.

In step S12, the optimization unit 10 sets initial operation data. As described above, the optimization unit 10 inputs the observation data and the operation data to the prediction model 11 to calculate the control target data, but the operation data is not provided from the decision model 12 in the first processing by the prediction model 11. It is therefore necessary to set the initial operation data for the first-loop process. In one example, the optimization unit 10 sets the initial operation data in a given time width after the reference time. The optimization unit 10 may set the initial operation data indicating that the operation value is 0 throughout the time width. The fact that the operation value is 0 means that no operation is performed. In another example, the optimized operation data may be set as the initial operation data.

In step S13, the optimization unit 10 inputs the observation data and the latest operation data to the prediction model 11 to calculate the control target data. The latest operation data is the initial operation data in the first loop, and is the operation data calculated by the decision model 12 in the second and subsequent loops.

In step S14, the optimization unit 10 inputs the calculated control target data, i.e., the latest control target data, to the decision model 12, to calculate the operation data. Depending on the cost calculation method, the optimization unit 10 may input the operation data obtained in the previous loop to the decision model 12.

In step S15, the optimization unit 10 determines whether to terminate the optimization of operation data. The optimization unit 10 may determine to terminate the optimization in a case where a combination of the prediction model 11 and the decision model 12 has been repeatedly executed a given number of times, and otherwise determine to continue the optimization. Alternatively, the optimization unit 10 may determine to terminate the optimization in a case where a variation of the cost calculated in the decision model 12 (for example, a difference between two costs of two consecutive loops) becomes smaller than a given threshold value, and otherwise determine to continue the optimization.

In a case where the optimization is continued (NO in step S15), the process returns to step S13, and a next loop process is executed. In step S13, the optimization unit 10 inputs the observation data and the operation data calculated in step S14 to the prediction model 11 to calculate new control target data. In step S14, the optimization unit 10 inputs the new control target data to the decision model 12 to calculate new operation data.

In a case where the optimization is terminated (YES in step S15), the process proceeds to step S16. In step S16, the optimization unit 10 outputs the optimal operation data. In one example, the optimization unit 10 transmits that operation data to the control device 3. The control device 3 operates based on the operation data to control the control target 4. In this autonomous operation, in a case where the plant 2 satisfies a given condition, the optimization unit 10 may terminate the instruction to the control device 3. The optimization unit 10 may output the operation data to the control device 3 and output the operation data to a given output device. The operator of the plant 2 can perceive the optimal operation data and grasp how the control device 3 will operate. Alternatively, the optimization unit 10 may output the operation data to the output device to assist the manual operation of the plant 2 by the operator, without transmitting the operation data to the control device 3. The operator can operate the control device 3 with reference to the operation data. Regardless of whether the operation of the control device 3 based on the operation data is performed automatically or manually, the control target 4 can be expected to be in a desired state by the operation data.

Next, the processing flow S2 will be described. In step S21, the optimization unit 10 acquires the observation data. This process is the same as step S11.

In step S22, the optimization unit 10 sets the initial operation data. This process is the same as step S12.

In step S23, the optimization unit 10 inputs the observation data and the latest operation data to the prediction model 11 to calculate control target data. The latest operation data is the initial operation data in the first loop, and is the operation data calculated by the first decision model 12a in the second and subsequent loops.

In step S24, the optimization unit 10 inputs the calculated control target data, i.e., the latest control target data to the first decision model 12a to calculate the operation data. Depending on the cost calculation method, the optimization unit 10 may input the operation data obtained in the previous loop to the first decision model 12a.

In step S25, the optimization unit 10 determines whether to terminate the first optimization. The optimization unit 10 may determine to terminate the first optimization in a case where a combination of the prediction model 11 and the first decision model 12a has been repeatedly executed a given number of times, and otherwise determine to continue the first optimization. Alternatively, the optimization unit 10 may determine to terminate the first optimization in a case where a variation of the cost calculated in the first decision model 12a (for example, a difference between two costs of two consecutive loops) becomes smaller than a given threshold value, and otherwise determine to continue the first optimization.

In a case where the first optimization is continued (NO in step S25), the process returns to step S23, and the next loop processing is executed. In step S23, the optimization unit 10 inputs the observation data and the operation data calculated in step S24 to the prediction model 11 to calculate new control target data. In step S24, the optimization unit 10 inputs the new control target data to the first decision model 12a to calculate new operation data.

In a case where the first optimization is terminated (YES in step S25), the processing proceeds to step S26. In step S26, the optimization unit 10 sets a setting value of the control target to the second decision model 12b. In one example, the optimization unit 10 inputs the operation data finally obtained by the first optimization and the observation data to the prediction model 11 to calculate the control target data. The optimization unit 10 sets that control target data to the second decision model 12b.

In step S27, the optimization unit 10 sets initial operation data. The optimization unit 10 may set the initial operation data indicating that an operation value is 0 throughout a given time width. Alternatively, the optimization unit 10 may set the operation data finally obtained in the first optimization as the initial operation data.

In step S28, the optimization unit 10 inputs the observation data and the latest operation data to the prediction model 11 to calculate the control target data. The latest operation data is the initial operation data in the first loop, and is the operation data calculated by the second decision model 12b in the second and subsequent loops.

In step S29, the optimization unit 10 inputs the calculated control target data, i.e., the latest control target data to the second decision model 12b to calculate the operation data. Depending on the cost calculation method, the optimization unit 10 may input the operation data obtained in the previous loop to the second decision model 12b.

In step S30, the optimization unit 10 determines whether to terminate the second optimization. The optimization unit 10 may determine to terminate the second optimization in a case where a combination of the prediction model 11 and the second decision model 12b has been repeatedly executed a given number of times, and otherwise determine to continue the second optimization. Alternatively, the optimization unit 10 may determine to terminate the second optimization in a case where a variation of the cost calculated in the second decision model 12b (for example, a difference between two costs of two consecutive loops) becomes smaller than a given threshold value, and otherwise determine to continue the second optimization.

In a case where the second optimization is continued (NO in step S30), the process returns to step S28 and a next loop process is executed. In step S28, the optimization unit 10 inputs the observation data and the operation data calculated in step S29 to the prediction model 11 to calculate new control target data. In step S29, the optimization unit 10 inputs the new control target data to the second decision model 12b to calculate new operation data.

In a case where the second optimization is terminated (YES in step S30), the process proceeds to step S31. In step S31, the optimization unit 10 outputs the optimal operation data. This process is the same as step S16.

Each of the processing flows S1 and S2 may be executed repeatedly at given time intervals. The given time interval may be uniform or may vary. For example, before a next processing flow S1 or S2 is executed, the observation data in the time interval is stored in the database 20, and the reference time advances by the time interval. The control system 1 executes the next processing flow S1 or S2 according to that lapse of time.

The optimization unit 10 may output the control target data corresponding to the optimal operation data to the output device. In the present disclosure, that control target data is also referred to as "optimal control target data". In the present disclosure, the "optimal control target data" refers to control target data estimated to be optimal, and is not necessarily the optimal control target data in reality. The optimization unit 10 inputs the observation data and the optimal operation data to the prediction model 11 to calculate the optimal control target data. The operator of the plant 2 can perceive the optimal control target data and grasp how the state of the control target 4 will proceed.

Figure 9:
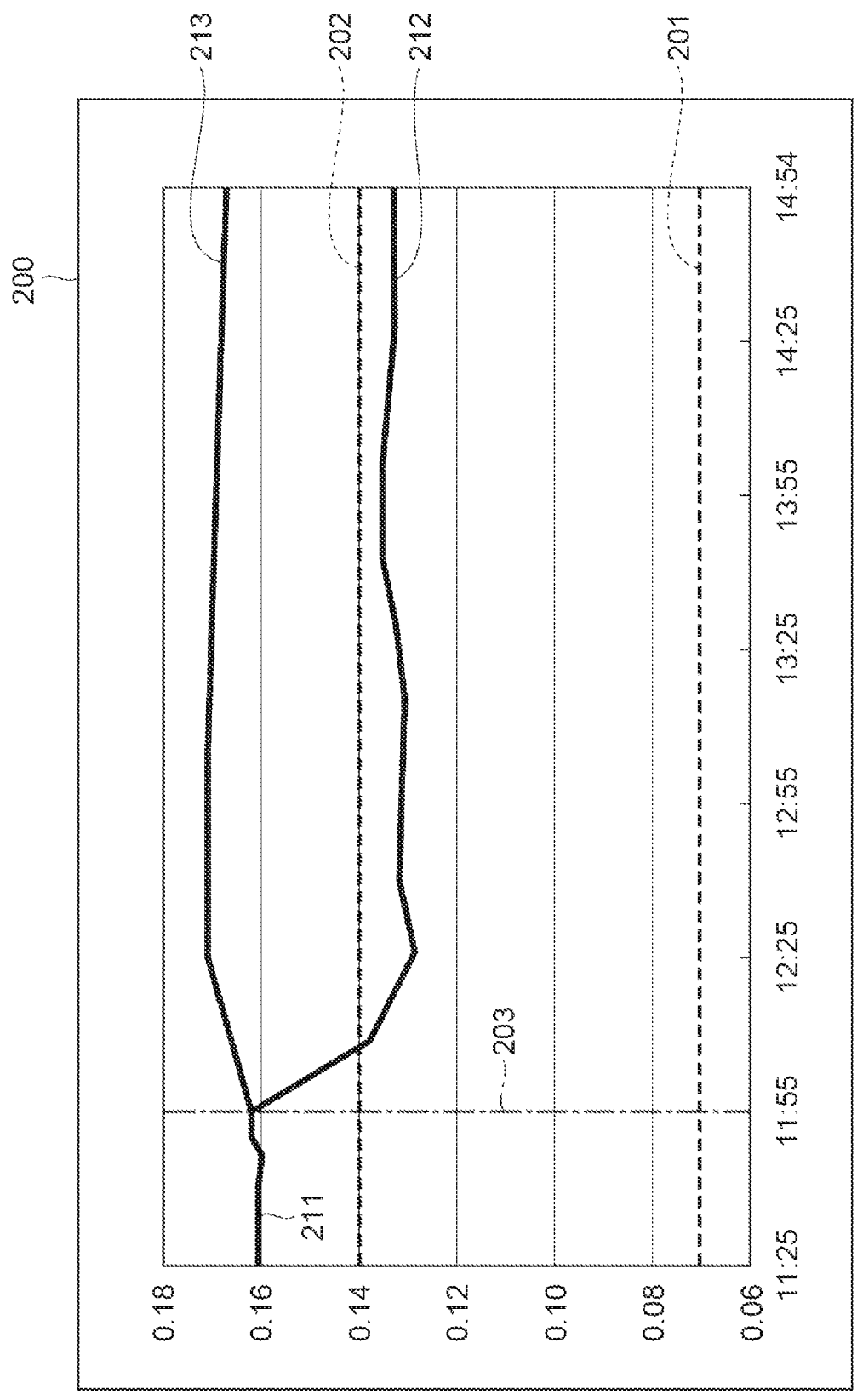
FIG. 9 is a diagram showing an example of a user interface.

An example of the output of control target data will be described with reference to FIG. 9. FIG. 9 is a diagram showing an example of user interface indicating the control target data. For example, the optimization unit 10 displays a user interface 200 on a display device. The user interface 200 indicates a temporal change of one physical parameter related to the control target 4. The vertical axis of the graph indicates a control target value, which is a value of that physical parameter. A lower limit line 201 and an upper limit line 202 indicate a management range of the control target value. The control target value is preferably within that management range. The horizontal axis of the graph indicates a time axis, and a reference line 203 indicate the reference time. A graph 211 indicates time-series data of an actual value of the physical parameter from 11:25 to 11:55, which is the reference time, and is obtained from the observation data. A graph 212 indicates time-series data of a predicted value of the physical parameter after the reference time, and is obtained from the optimal control target data. A graph 213 is a predicted value of the physical parameter in a case where the control device 3 is not operated after the reference time. The graph 213 is obtained by, for example, inputting the observation data and the operation data indicating that the operation value after the reference time is 0 to the prediction model 11. The graph 212 indicates first control target data corresponding to the optimal operation data. It can be said that the graph 213 represents an example of second control target data corresponding to comparison operation data different from the optimal operation data. The optimization unit 10 may display the graph 211, graph 212, and graph 213 at the same time, or may display them in a switchable manner. From the results shown in the user interface 200, it can be seen that in a case where the control device 3 is operated based on the optimal operation data, the control target 4 can be transitioned to an appropriate state, whereas in a case where that operation is not performed, such appropriate control cannot be performed. The optimization unit 10 may further display the optimal operation data on the user interface. That is, at least one processor may display, simultaneously or in a switchable manner, a user interface indicating the determined operation data, the first control target data corresponding to the determined operation data, and the second control target data corresponding to the comparison operation data different from the determined operation data, on the display device.

Effects

As described above, a control system according to an aspect of the present disclosure includes at least one processor and at least one memory. The at least one processor is configured to determine operation data by repeating a process of calculating control target data indicating a predicted value of a control target in a plant and the operation data indicating an operation value of a control device of the plant by a given calculation model based on observation data indicating an actual value of the plant.

A control method according to an aspect of the present disclosure is executable by a control system including at least one processor and at least one memory. The method comprising: determining operation data by repeating a process of calculating control target data indicating a predicted value of a control target in a plant and the operation data indicating an operation value of a control device of the plant by a given calculation model based on observation data indicating an actual value of the plant.

A non-transitory computer-readable storage medium according to an aspect of the present disclosure stores processor-executable instructions to: determine operation data by repeating a process of calculating control target data indicating a predicted value of a control target in a plant and the operation data indicating an operation value of a control device of the plant by a given calculation model based on observation data indicating an actual value of the plant.

In the control system according to another aspect, the plant may be a petroleum-related plant.

A control program according to an aspect of the present disclosure causes a computer to execute: determining operation data by repeating a process of calculating control target data indicating a predicted value of a control target in a plant and the operation data indicating an operation value of a control device of the plant by a given calculation model based on observation data indicating an actual value of the plant.

A plant according to an aspect of the present disclosure includes: the control system described above; and the control device.

In these aspects, the control target data and the operation data are updated by repeating the process using the calculation model, and the operation data is finally determined. It is therefore possible to reduce the load on the proper operation of the plant. In the technique described in Japanese Patent Publication No. 2002-373002 A, which is mentioned above, since it is necessary to perform a test in an actual machine or a process simulator in advance to obtain the step response time series, the preparation is burdensome, or it is necessary to improve the accuracy of the process simulator. In an aspect of the present disclosure, since it is not necessary to prepare the step response time series, it is possible to reduce the load required to construct the calculation model and to rapidly update the calculation model in accordance with the operation state of the plant.

In the control system according to another aspect, the calculation model may include: a prediction model configured to calculate the control target data based on the observation data and the operation data; and a decision model configured to calculate the operation data based on the control target data, and the at least one processor may be configured to determine the operation data by repeating the process using the prediction model and the decision model. The operation data can be accurately estimated by the iterative process using such two types of models.

In the control system according to another aspect, the prediction model may include a neural network that receives an input of the observation data and the operation data and outputs the control target data. Since the control target data for obtaining the operation data can be automatically obtained by adopting the neural network, the operation data can be determined without preparing the control target data in advance.

In the control system according to another aspect, the decision model may include nonlinear optimization using a cost function that calculates a cost related to the plant, and the at least one processor may be configured to calculate the operation data based on the cost calculated by the cost function. By adopting the nonlinear optimization, the operation data can be estimated accurately.

In the control system according to another aspect, the at least one processor may calculate a stability cost related to stability of the plant as the cost related to the plant. In this case, the operation data in which the stability of the plant is taken into consideration can be obtained.

In the control system according to another aspect, the at least one processor may be configured to calculate a degree of deviation of the control target data from a setting value for the control target as the stability cost. By using the degree of deviation, it is possible to obtain the operation data in which the stability of the plant is taken into consideration.

In the control system according to another aspect, the setting value for the control target may be a management range defined by an upper limit and/or a lower limit, and the at least one processor may be configured to calculate the degree of deviation of the control target data from the management range. By taking the degree of deviation into consideration, it is possible to obtain the operation data in which the stability of the plant is taken into consideration, while providing a margin in the operation of the plant.

In a control system according to another aspect, the setting value for the control target may be a reference value, and the at least one processor may be configured to calculate the degree of deviation of the control target data from the reference value. By using the degree of deviation, the operation data for further stabilizing the control target can be obtained.

In the control system according to another aspect, the at least one processor may be configured to: calculate the degree of deviation at each of a plurality of measurement points on a time axis; and calculate the cost based on a plurality of the degrees of deviation. By using the cost, it is possible to obtain the operation data in consideration of the stability of the plant in a given time width.

In the control system according to another aspect, the at least one processor may be configured to calculate an amount of fluctuation of the operation data as the stability cost. By taking the amount of fluctuation into consideration, the operation data that makes the operation of the control device smooth can be obtained.

In the control system according to another aspect, the at least one processor may be configured to: calculate, based on a plurality of measurement points on a time axis, the amount of fluctuation between the measurement points; and calculate the cost based on a plurality of the amounts of fluctuations. By considering the amount of fluctuation at given intervals along the time axis, it is possible to obtain the operation data that makes the operation of the control device smooth in a given time width.

In the control system according to another aspect, the at least one processor may be configured to calculate a profitability cost related to profitability of the plant as the cost related to the plant. In this case, the operation data in which the profitability of the plant is taken into consideration can be obtained.

In the control system according to another aspect, the decision model may comprise: a first decision model including the nonlinear optimization using a first cost function; and a second decision model including the nonlinear optimization using a second cost function, and the at least one processor may be configured to determine the operation data by repeating a first process using the prediction model and the first decision model and repeating a second process using the prediction model and the second decision model. By dividing the decision model, the cost function in each decision model can be simplified.

In the control system according to another aspect, the at least one processor may be configured to: repeat the first process to determine the control target data to be used as a setting value for the control target; set the determined control target data to the second decision model; and repeat the second process using the prediction model and the second decision model to determine the operation data. Since a target in the second decision model is automatically set by the setting value, it is not necessary to prepare the target. Accordingly, the load on the appropriate operation of the plant can be reduced.

In the control system according to another aspect, the at least one processor may be configured to, in the second decision model, calculate the cost based on the determined control target data and the second cost function; and calculate the operation data based on the calculated cost. In this case, a target for calculating the cost in the second decision model can be automatically set.

In the control system according to another aspect, the at least one processor may be configured to display, simultaneously or in a switchable manner, a user interface indicating first control target data corresponding to the determined operation data and second control target data corresponding to comparison operation data different from the determined operation data, on a display device. The user interface makes it possible to inform a user how the predicted value of the control target differs between the case where the determined operation data is used and the case where the determined operation data is not used.

In the control system according to another aspect, the at least one processor may be further configured to output the determined operation data to the control device, and the control device may be configured to control the control target based on the determined operation data. By the processing, it is possible to control the plant appropriately and automatically.

Additional Examples

The embodiments of the present disclosure are described above in detail. However, the present disclosure is not limited to the embodiments described above. Various modifications may be made to the present disclosure without departing from the scope thereof.

In the present disclosure, the expression of "transmitting" data or information from a first computer to a second computer, or the expression corresponding thereto means a transmission to finally deliver the data or information to the second computer. It is noted that the expression may also mean a case where another computer or a communication device relays the data or information in that transmission.

In the present disclosure, "at least one processor executes a first process, executes a second process, . . . , executes an n-th process" or an expression corresponding thereto indicates a concept including a case where the execution subject (i.e., processor) of n processes from the first process to the n-th process changes in the middle. That is, the expression indicates a concept including both a case where all of the n processes are executed by the same processor and a case where the processor changes in any policy among the n processes.

A processing procedure of a method executed by at least one processor is not limited to examples in the embodiments. For example, some of the above-described steps (processes) may be omitted, or the steps may be executed in a different order. Furthermore, any two or more steps among the above-described steps may be combined, or part of the steps may be modified or deleted. Alternatively, other steps may be executed in addition to the above-described steps.

What is claimed is:
1. A control system comprising:
at least one processor; and
at least one non-transitory memory, wherein
the at least one processor is configured to determine operation data indicating an operation value of a control device that controls a plant by repeating first and second processes in a plurality of iterations,
a variable (i) denotes an (i)th iteration of the first and second processes, and a variable (i−1) denotes an (i−1)th iteration of the first and second processes before the (i)th iteration, the first process is a process of calculating control target data indicating a predicted value of a control target in the plant in the (i)th iteration by inputting, into a prediction model that is a neural network, observation data indicating an actual value of the plant, and
operation data obtained in the (i−1)th iteration, and the second process is a process of calculating the operation data in the (i)th iteration by inputting, into a decision model, the control target data obtained in the (i)th iteration, the at least one processor is further configured to output the determined operation data to the control device that controls the plant, and the control device controls the control target based on the determined operation data.

2. The control system according to claim 1, wherein
the at least one processor is configured to calculate the operation data based on the control target data by employing nonlinear optimization using a cost function that calculates a cost related to the plant, and
the at least one processor is configured to calculate the operation data based on the cost calculated by the cost function.

3. The control system according to claim 2, wherein the at least one processor calculates a stability cost related to stability of the plant as the cost related to the plant.

4. The control system according to claim 3, wherein the at least one processor is configured to calculate an amount of fluctuation of the operation data as the stability cost.

5. The control system according to claim 4, wherein the at least one processor is configured to:
calculate, based on a plurality of measurement points on a time axis, the amount of fluctuation of the operation data between the measurement points; and
calculate the cost related to the plant based on a plurality of the amounts of the fluctuations of the operation data.

6. The control system according to claim 2, wherein the at least one processor is configured to calculate a profitability cost related to profitability of the plant as the cost related to the plant.

7. The control system according to claim 6, wherein the at least one processor is configured to
calculate the operation data based on the control target data by employing the nonlinear optimization using a first cost function, and
calculate the operation data based on the control target data by employing the nonlinear optimization using a second cost function, and
the at least one processor is configured to determine the operation data by
repeating a process that includes a) calculating the control target data in the (i)th iteration based on the observation data and the operation data in the (i−1)th iteration, and b) calculating the operation data in the (i)th iteration based on the control target data in the (i)th iteration, by using the nonlinear optimization according to the first cost function, and
repeating a process that includes a) calculating the control target data in the (i)th iteration based on the observation data and the operation data in the (i−1)th iteration, and b) calculating the operation data in the (i)th iteration based on the control target data in the (i)th iteration, by using the nonlinear optimization according to the second cost function.

8. The control system according to claim 7, wherein the at least one processor is configured to:
repeat the first process to determine the control target data to be used as a setting value for the control target;
set the determined control target data to calculate the operation data in the (i−1)th iteration based on the control target data in the (i−1)th iteration by employing the nonlinear optimization using the second cost function; and
repeat the second process to determine the operation data.

9. The control system according to claim 8, wherein the at least one processor is configured to, in calculating the operation data in the (i)th iteration based on the control target data in the (i)th iteration by employing the nonlinear optimization using the second cost function,
calculate the cost based on the determined control target data and the second cost function; and
calculate the operation data based on the calculated cost.

10. The control system according to claim 1, wherein the at least one processor is configured to calculate a degree of deviation of the control target data from a setting value for the control target as a stability cost related to stability of the plant.

11. The control system according to claim 10, wherein
the setting value for the control target is in a management range defined by an upper limit and/or a lower limit, and
the at least one processor is configured to calculate the degree of deviation of the control target data from the management range.

12. The control system according to claim 10, wherein
the setting value for the control target is a reference value, and
the at least one processor is configured to calculate the degree of deviation of the control target data from the reference value.

13. The control system according to claim 10, wherein the at least one processor is configured to:
calculate the degree of deviation at each of a plurality of measurement points on a time axis; and
calculate the cost related to the plant based on a plurality of the degrees of deviation.

14. The control system according to claim 1, wherein the at least one processor is configured to display, simultaneously or in a switchable manner, a user interface indicating first control target data corresponding to the determined operation data and second control target data corresponding to comparison operation data different from the determined operation data, on a display device.

15. The control system according to claim 1, wherein the plant is a petroleum-related plant.

16. A control method executable by a control system including at least one processor and at least one non-transitory memory, the method comprising:
determining operation data indicating an operation value of a control device that controls a plant by repeating first and second processes in a plurality of iterations, wherein
a variable (i) denotes an (i)th iteration of the first and second processes, and a variable (i−1) denotes an (i−1)th iteration of the first and second processes before the (i)th iteration,
the first process is a process of calculating control target data indicating a predicted value of a control target in the plant in the (i)th iteration by inputting, into a prediction model that is a neural network observation data indicating an actual value of the plant, and operation data obtained in the (i−1)th iteration, and the second process is a process of calculating the operation data in the (i)th iteration by inputting, into a decision model, the control target data obtained in the (i)th iteration;

outputting the determined operation data to the control device that controls the plant; and controlling the control target with the control device based on the determined operation data.

17. The control method according to claim 16, further comprising calculating a degree of deviation of the control target data from a setting value for the control target as a stability cost related to stability of the plant.

18. The control method according to claim 17, wherein the setting value for the control target is in a management range defined by an upper limit and/or a lower limit, and the calculating the degree of deviation includes calculating the degree of deviation of the control target data from the management range.

19. The control method according to claim 17, wherein the setting value for the control target is a reference value, and the calculating the degree of deviation includes calculating the degree of deviation of the control target data from the reference value.

20. A non-transitory computer-readable storage medium storing processor-executable instructions to:

determine operation data indicating an operation value of a control device that controls a plant by repeating first and second processes in a plurality of iterations, wherein a variable (i) denotes an (i)th iteration of the first and second processes, and a variable (i−1) denotes an (i−1)th iteration of the first and second processes before the (i)th iteration, the first process is a process of calculating control target data indicating a predicted value of a control target in the plant in the (i)th iteration by inputting, into a prediction model that is a neural network, observation data indicating an actual value of the plant, and operation data obtained in the (i−1)th iteration, and the second process is a process of calculating the operation data in the (i)th iteration by inputting, into a decision model, the control target data obtained in the (i)th iteration;

output the determined operation data to the control device that controls the plant; and control the control target with the control device based on the determined operation data.

* * * * *